United States Patent Office 2,979,920
Patented Apr. 18, 1961

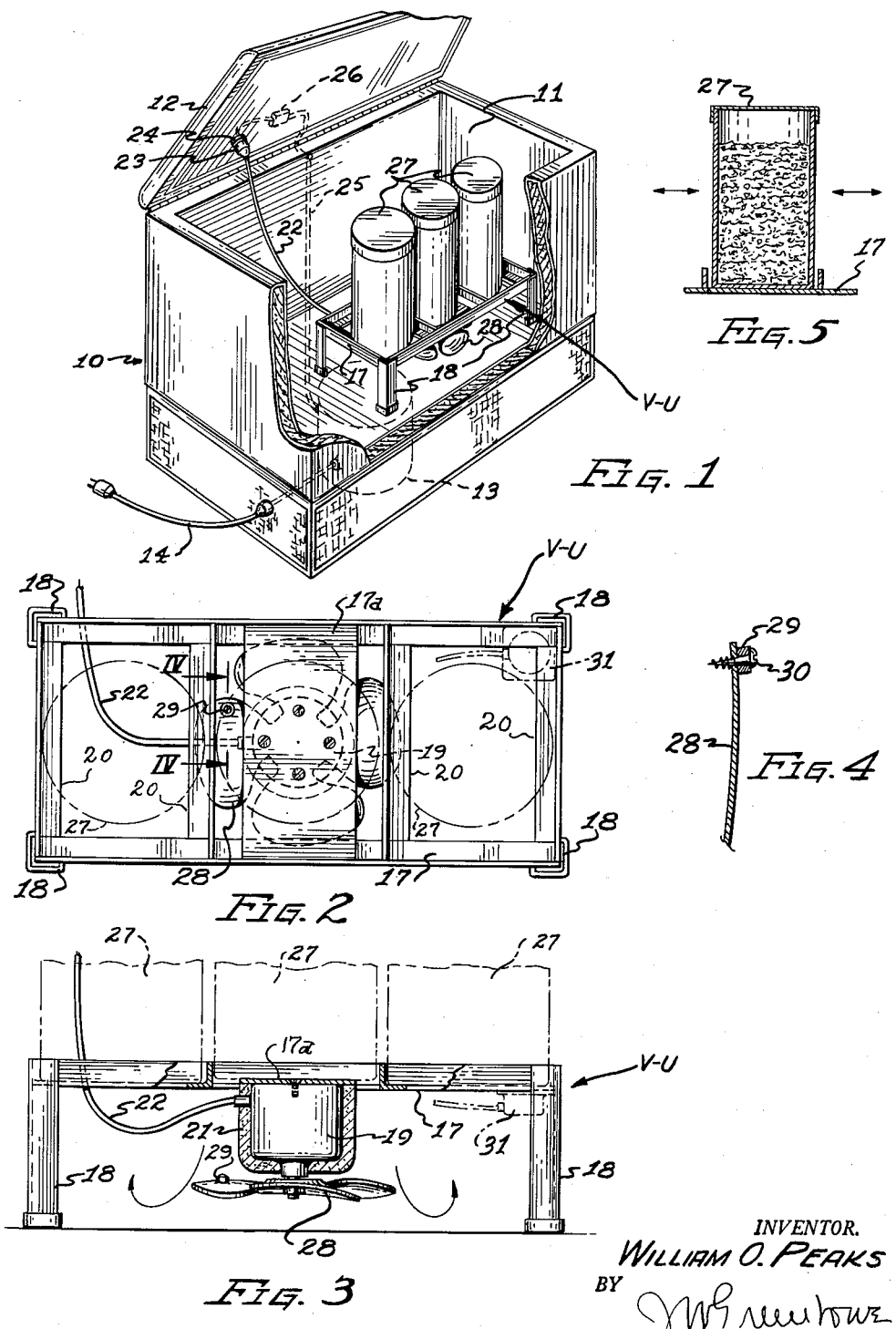

2,979,920

APPARATUS FOR SEMIFREEZING BEVERAGES

William O. Peaks, 9146 Cave Creek Road, Phoenix, Ariz.

Filed May 28, 1959, Ser. No. 816,410

4 Claims. (Cl. 62—342)

The present invention relates to a method and apparatus for semifreezing liquids and relates more particularly to the treatment of a beverage during a freezing period.

A well known practice is to subject a beverage to a freezing temperature to produce a drink in the form of frozen particles or slush. This has been accomplished by freezing a liquid composed of syrup and water until hardened to a point below complete solidity. This frozen mass is then broken up by mechanical means until in the form of a slush to be consumed as a drink. A drink produced by freezing a liquid until nearly solid and subsequently crushing by mechanical means provides a crushed ice or slush type of beverage which, although drinkable, lacks the desired smoothness and proper distribution of the flavoring to give complete satisfaction from the standpoint of palatability.

In accordance with the present invention a liquid is so treated during a freezing period as to produce a beverage composed of individual frozen crystals in the form of a drinkable slush of uniform consistency while retaining the desired flavor of the ingredients of the beverage.

It has been found that when a liquid, as for example a beverage having selected proportions of water and syrup, is subjected to continuous vibration causing agitation of the liquid during the freezing period, the resultant semifrozen composition consists entirely of minute frozen crystals in the form of a smooth drinkable slush in the absence of relatively large particles requiring mechanical disintegration.

An object of the invention is to provide a method and apparatus for freezing and treating a liquid to produce a semifrozen beverage.

Another object of the invention is to provide a method of producing a frozen beverage in the form of a drinkable slush of uniform consistency.

Another object of the invention is to provide means for semifreezing a liquid under conditions whereby the liquid, when semifrozen, consists of minute frozen particles free from relatively large solidly frozen portions.

Another object of the invention is to provide a vibratory unit for use in a refrigerator compartment for supporting and maintaining a liquid in a state of agitation while subjected to a temperature to semifreeze the liquid.

Another object of the invention is to provide a portable structure for supporting a liquid container and means for vibrating the structure to agitate the liquid in the container in combination with means for causing a circulation of the air about the container.

Other objects and advantages of the invention will be more clearly understood by reference to the following description together with the accompanying drawing in which:

Fig. 1 is a perspective view of one practical embodiment of the invention showing a refrigerator compartment partly broken away to show a vibratory unit supporting liquid containers;

Fig. 2 is a plan view of the unit shown in Fig. 1;

Fig. 3 is a side elevational view of the unit shown in Fig. 2;

Fig. 4 is a cross sectional view of a fan blade with a weight member secured thereto and Fig. 5 is a cross sectional view of a container having a quantity of liquid therein.

As stated, the invention is directed to the treatment of a liquid and may be practiced in combination with a refrigerator 10 including a compartment 11 having a lid or cover 12 and a freezer unit of any well known type, the compressor 13 of which is indicated in dotted lines and is supplied with electrical energy by means of conductor 14 connected to a power source (not shown).

In order to carry out the treatment of a liquid when exposed to low temperature environment within the compartment 11 a unit termed a vibratory unit is provided and indicated as whole by the reference character V-U.

This unit includes a frame or platform consisting of a portable structure 17, having cross-members 20 and cross-plate 17a, supported on legs 18. Secured to the underside of the cross-plate is an electric motor 19 having an insulating jacket 21. Electrical energy for actuating the motor may be supplied by means of conductor 22 having one end electrically connected to motor 19 and an opposite end provided with a plug 23 to connect with a socket 24 secured to lid 12 of compartment 11. Conductor 25 including a mercury switch 26 is connected in the electrical circuit of the refrigerator unit. The mercury switch 26 is so arranged on the cover 12 that when the cover is down to close the compartment 11 current will flow to operate the motor 19. When the cover is raised to open the compartment the circuit will be broken and the motor rendered inoperative.

The motor 19 as shown is secured to the underside of cross plate 17a. Secured to the shaft of the motor is, in the present case, a four blade air circulating fan 28. Positioned on the cross members 20 of the supporting frame 17 are removable containers 27 which contain a liquid such as a beverage composed, for example, of syrup and water in selected proportions, to be subjected to a temperature within the compartment sufficient to cause the liquid to become semifrozen.

Ordinarily when the liquid is quiescent during the required semifreezing period the resultant mass is nonuniform in that, although semifrozen condition is reached, the mass contains an appreciable amount of aggrevate or lumps having been frozen to a solid state and requiring mechanical crushing which, although removing relatively large particles, fails to bring about the desired uniformity to the resultant slush used as a liquid refreshment.

In accordance with the present invention the liquid is converted into a smooth homogeneous slush by vibrating the liquid and maintaining it in an agitated condition until semifrozen and until removed for use.

One practical means of agitating the liquid during semifreezing period is to over balance the action of the fan 28 to cause the fan, during its rotary movement, to vibrate the unit V-U. This may be accomplished by adding to the weight of one of the fan blades by securing thereto a weight member in the form of a metal washer 29 by means of a screw 30 or by welding. It has been found that a weight, when secured adjacent to the edge of the free end of a blade, sets up sufficient vibration throughout the V-U unit to agitate the liquid.

When the liquid, by reason of the weighted fan blade, is subjected to a continuous vibration during the freezing or semifreezing period the liquid is converted into a frozen mass of uniform consistency to provide a smooth slush type drink composed of minute frozen crystals.

Although the modified fan arrangement has been found, in practice, to give satisfactory results it is to be understood that the vibratory action may be provided by other means. For example, a vibrator 31 of any selected well known type may be secured to frame 17 to provide the vibratory action in which case the fan may operate without weight added to a blade.

As will be evident, the circulated air makes contact with the sides of the containers since, as shown, the containers are positioned on the cross-members 20 and plate 17a thus permitting free upward travel of the air circulated by the fan. Satisfactory results have been obtained by circulating the air about the containers with the freezer unit providing a temperature of about twenty degrees below zero Fahrenheit.

From the foregoing it will be evident that the present invention provides a vibratory unit that may be positioned in a freezer of suitable size in a drink dispensing store or stand where it is desirable to produce and sell slush type beverages directly to customers. By means of the present apparatus a beverage in a container may be subjected to the above described vibratory and freezing operation to convert the liquid into the desired slush condition. The cover of the compartment may be opened and an amount of slush, to be consumed as a drink, may be removed and sold over the counter. As the slush is removed from the container liquid, of syrup and water, may be added from time to time to be semifrozen under vibration to maintain the desired amount of slush ready for sale direct from the container.

Although a preferred embodiment of the invention is shown and described herein it is to be understood that modifications may be made therein without departing from the spirit and scope of the invention as set forth in the appended claims.

I claim:

1. A portable vibratory unit for deposit in a commercial refrigerator compartment, said unit including a platform for supporting a liquid in a container above the floor of said compartment, a vibrator mounted on said unit to vibrate said platform to agitate said container and liquid, means for circulating the air within said compartment, said platform having apertures for the passage of air about said container during the semifreezing of said liquid.

2. A portable vibratory unit for deposit in a commercial refrigerator compartment, said unit including a platform for supporting a liquid in a container above the floor of said compartment, a vibrator mounted on said unit to vibrate said platform to agitate said container and liquid, a motor mounted on said unit, a fan secured to the shaft of said motor for circulating the air within said compartment, said platform having apertures for the passage of air therethrough and about said container during the semifreezing of said liquid.

3. An apparatus for producing a drinkable slush beverage comprising a portable vibratory unit for deposit in a refrigeration compartment, said unit including a platform having spaced apart cross members, a container having a liquid therein and positioned on said cross members, a fan secured to the underside of said platform, means for rotating said fan for the passage of air between said cross members and in contact with the surface of said container to uniformly semifreeze said liquid, and means for vibrating said unit during the semifreezing of said liquid.

4. An apparatus for producing a drinkable slush beverage comprising a portable vibratory unit for deposit in a refrigeration compartment, said unit including a platform having spaced apart cross members, a container having a liquid therein and positioned on said cross members, a fan secured to the underside of said platform, means for rotating said fan for the passage of air between said cross members and in contact with the surface of said container to uniformly semifreeze said liquid, and a weight member secured to a blade of said fan to cause said fan to vibrate said unit during the semifreezing of said liquid.

References Cited in the file of this patent

UNITED STATES PATENTS

| | | |
|---|---|---|
| 507,005 | Hill | Oct. 17, 1893 |
| 1,796,828 | Clingman | Mar. 17, 1931 |
| 2,000,021 | Hoffman | May 7, 1935 |
| 2,028,806 | Rechtin | Jan. 28, 1936 |
| 2,247,904 | Brace | July 1, 1941 |